Patented Mar. 14, 1933

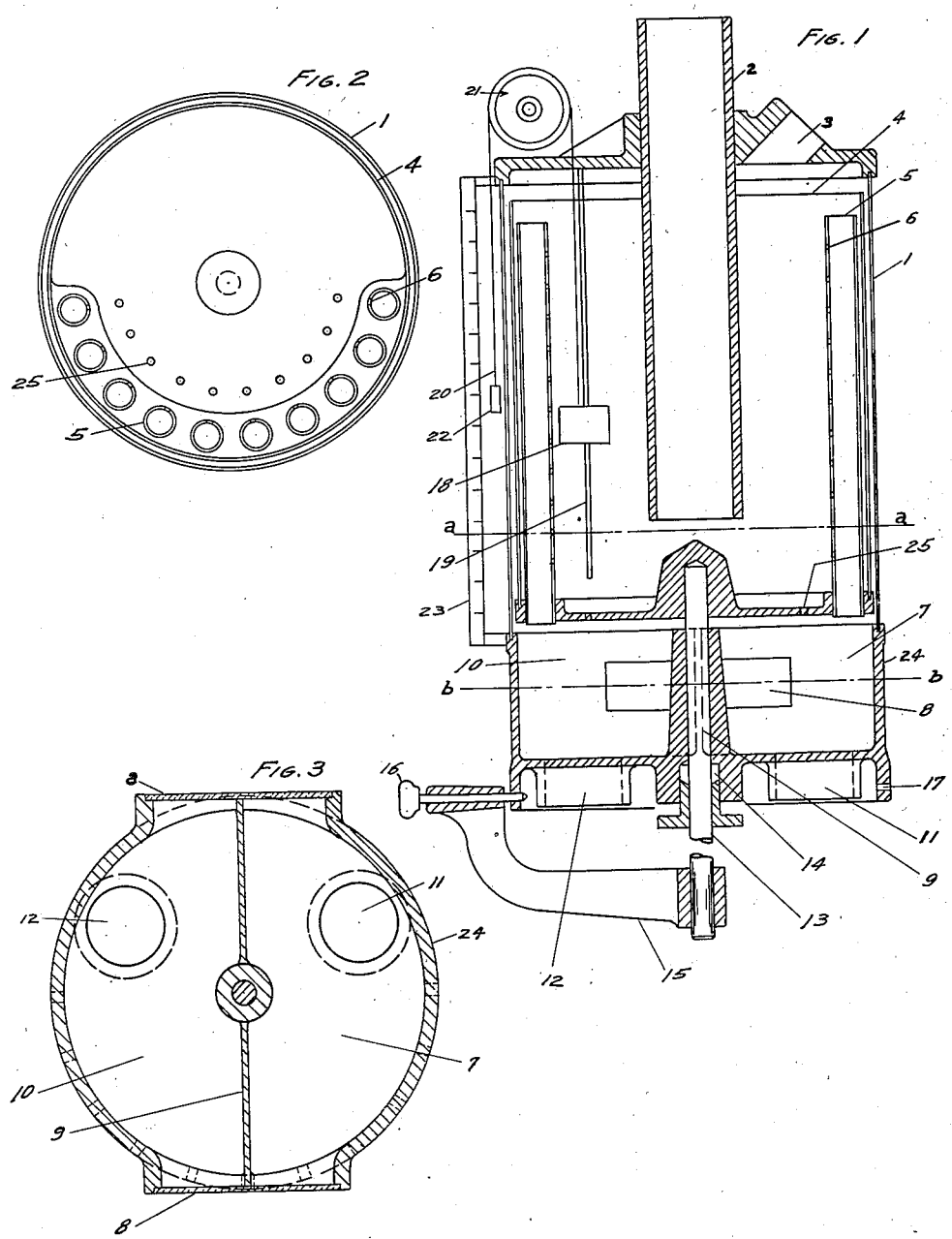

1,901,481

UNITED STATES PATENT OFFICE

ROBERT H. VAN SCHAACK, JR., OF EVANSTON, ILLINOIS, ASSIGNOR TO VAN SCHAACK BROS. CHEMICAL WORKS, INC., OF CHICAGO, ILLINOIS, A CORPORATION OF ILLINOIS

DISTRIBUTOR FOR LIQUIDS

Application filed February 25, 1929. Serial No. 342,359.

This invention relates to a distributor for liquids. An object is to provide means for dividing a body or stream of liquid into two or more portions in a predetermined ratio, in a simple manner. Other objects will appear from the detailed description which follows.

It has been customary to gage liquid flow by means of weirs. A common type of weir contains a V-notch against which liquid rises and through which it flows out. With a multiplicity of notches, it is possible to divide a liquid into as many separate streams as there are notches through which it flows. It is possible also to calculate the amount of liquid flowing through each notch by a formula involving a number of factors including the angle of the notch, the height at which the water stands above the level of the bottom of the notch, the rate of approach of the liquid to the notch, and the viscosity of the liquid.

In many manufacturing operations, it is desired simply to know and to have means of determining the relative volumes of two or more streams of liquid. In fractional distillation, such a case arises frequently. Thus, when a portion of the condensate is returned to the fractionation column as reflux, it is important to be able to control the ratio of reflux to total condensate. It is often desired to return as reflux 1, 2, 3, 4, 5, or 6 parts, for example, of the condensate to each 1 part of condensate accepted as fractionated product. This separation of condensate into reflux and product, in a predetermined ratio, is an example of one use of the mechanism that constitutes my invention.

An embodiment of my invention is based on the principle of providing a plurality of holes of equal size, allowing liquid at equal head to flow through these holes, and collecting the effluent from a certain fraction of the total number of holes in one receptacle or pipe and the effluent from the remaining fraction in another receptacle or in other receptacles.

Details of this example of the invention are shown in Figs. 1, 2, and 3. Figure 1 is a vertical section through the center line of the entire distributor. Figure 2 is a horizontal cross-section along the line a—a, Figure 1. Figure 3 is a horizontal cross-section of the distributor along the line b—b, Figure 1. Similar numerals refer to similar parts throughout the several views. There is provided a metal vessel (1) with an inlet for liquid (2), an air vent (3), and an inner vessel or member (4) which receives the liquid from the inlet (2) and allows the liquid to flow through a series of upright pipes (5) with holes (6) of equal size, number, and elevation in each pipe, into a vessel (24), with sight glasses (8). This vessel (24) is divided by a diametrical partition (9) into two compartments (7) and 10) from one of which leads a discharge pipe (11) and from the other, another discharge pipe (12). The pipes (5) are suitably arranged in an arc of 180°. The inner vessel (4) carrying the pipes (5) is attached to a shaft (13) which passes through a stuffing box (14) to a handle (15) by means of which the inner assembly carrying the pipes (5) may be rotated through approximately 180°. The handle (15) carries a plunger (16) which may be engaged in any one of the stops (17).

The liquid falling to one side of the diametrical partition (9) in the vessel (24) passes to a discharge pipe (11) and the liquid falling on the other side of the partition goes to another discharge pipe (12). The proportion of the total number of upright pipes (5) delivering to either discharge pipe may be adjusted by moving the handle (15) in such manner as to rotate the inner assembly and bring the desired number of upright pipes (5) over one compartment (7) vessel (24) and the remainder of the pipes over the other compartment (10). Once this rotation has been made, the handle plunger (16) is engaged in one of the stops (17) in order to avoid further accidental rotation. When liquid is flowing, one may count, through the sight glasses (8), the number of streams of liquid delivered to each discharge pipe although the ratio of distribution is best observed by noting the setting of the handle (15) which controls the rotation of the inner vessel. If it is desired also to calculate the actual volumn of total liquid flowing, this may be done by measuring the level of liquid in the inner chamber (4) and comparing this level or head with a previously determined calibration chart showing the rate of flow for various heights of head. The measurement of elevation of head of liquid may be made by means of a float (18) movable along a vertical guide rod (19), attached to a light flexible cable or cord (20) which passes over a pulley (21) to a counterbalance of light metal (22). The position of the lower end of the counterbalance (22) may be read against a scale (23) to show the height of liquid above the bottom of the inner vessel. The weight of the counterbalance and accessories should be just slightly less than that of the float, in order that the float may always rest lightly on the liquid.

The method of use of the apparatus will be understood from the drawings and the description. Liquid enters through the inlet, and then flows through holes in the series of upright pipes. The liquid rises, of necessity, to the same height on each member of this series of tubes. If the lowest hole in each of the series of tubes does not allow the escape of liquid as fast as liquid is being delivered through the inlet, the liquid level will rise until there is flow also through additional holes at a higher elevation on the tubes.

When the holes at a given elevation are of the same diameter on all the series of upright pipes, each pipe delivers approximately the same quantity of liquid to the lower compartment. With a series of 10 upright pipes, it is possible, therefore, to deliver into either half of the lower compartment 10%, 20%, 30%, 40%, 50%, 60%, 70%, 80%, 90%, or 100% of the liquid entering through the inlet pipe.

Many variations may be made from the details given in the illustrative example above, without departing from the spirit of my invention.

Thus, I may use any number of upright tubes. In general, the larger the number of tubes, the smaller the variations that may be made in the ratio of distribution of liquid. Thus, with 20 tubes, of equal number, size, and elevation of holes, it is possible to vary the division of a liquid by steps of 5% each. Thus, the percentage of total liquid delivered to a given receptacle or compartment will be 5% of the total, if only one tube is delivering into that compartment, and will be 5% addition for each additional tube so delivering. If only 3 tubes are used, on the other hand, the distribution may be varied only in steps of 33.3% each. Thus a given receptacle may receive 0%, 33.3%, 66.6%, or 100.0% of the total liquid.

The size of the tubes, diameter, and/or height may be varied. Also they may be arranged in a setting different from that shown. Thus, they may be set in an arc greater than 180°, in which case the vessel carrying the tubes and the accessories may be so constructed that rotation may be made through approximately an equal angle.

While I have described the rotation of the member that carries the tubes, I may keep the tubes stationary and rotate a receptacle, beneath the discharge of the tubes, or otherwise move the receptacle, as, for example, to one side, in such a way as to vary the number of streams of liquid collected in a given receptacle or compartment. Inequalities in sizes of holes in the different pipes at any one elevation complicate the calculation of ratio of liquid distribution and are preferably avoided. On the other hand, variations in the sizes of holes in any one pipe do not complicate the calculation, so long as the holes in all pipes, at equal elevations, are substantially the same. Thus, I find quite satisfactory the use of a small hole (25), Figs. 1 and 2, say of diameter one-fourth that of the pipe, at the base of each pipe, then a vertical series of holes each half the diameter of the pipe, and, finally, the open end of the pipe itself as the top hole. The small hole mentioned above may be drilled either in the base of the tube itself, or, adjacent to the base of the tube, vertically through the plate which carries the tube. The latter method ensures complete drainage of the vessel at the conclusion of an experiment or factory batch.

In some cases the upright pipes may be free from lateral holes, the liquid entering the pipes only through the open, upper end and passing out through the lower end.

Although I find upright tubes quite satisfactory, inclined tubes may be used.

I claim:

1. A distributor for liquids comprising a plurality of tubes which may be so placed by rotation of the vessel containing them that any number of them will deliver liquid to one receptacle and the remaining tubes will deliver liquid to another receptacle.

2. A distributor for liquids comprising a plurality of upright tubes which may be so placed by rotation of the vessel containing them that any number of them will deliver liquid to one receptacle and the remaining tubes will deliver liquid to another receptacle.

3. An adjustable distributor for liquids capable of controlled variability in the ratio of the distributed streams, said distributor comprising an inlet for liquid and a plurality of upright tubes in all of which there are open lower ends and side holes of sizes that are the same at equal elevations, said tubes being set in a rotatable vessel that has no substantial outlet near its bottom except for the holes in the tubes which pass through the bottom.

4. A distributor for liquids comprising a number of upright, perforated pipes, arranged in an arc of a circle, and provided with a mechanism for rotation in such manner as to allow liquid discharged from any number of the pipes to pass into a given receptacle.

5. A distributor for liquids comprising a series of upright pipes containing each a number of lateral holes, the lowest of which are completely submerged during use, and also receptacles for receiving the liquid which flows out of the lower ends of any selected number of the tubes, the upright tubes being set in a carriage which may be shifted with respect to the position of receptacles placed below the outlet of the tubes so as to change the ratio of the streams delivered.

6. A distributor for liquids comprising a series of upright pipes containing each a number of lateral holes, the lowest of which are completely submerged during use, and also receptacles for receiving the liquid which flows out of the lower ends of any selected number of the tubes, the upright tubes being set in a carriage which may be shifted, by rotation, with respect to the position of receptacles placed below the outlet of the tubes.

7. A distributor for liquids comprising an apportioning vessel having a plurality of uniform-discharge devices, opening into a distributing vessel having two compartments arranged to deliver the liquid to different places, said apportioning and distributing vessels being displaceable relative to one another so as to vary the number of discharge devices opening into each compartment of the distributing vessel, said displaceability being such that the number of discharge devices opening into either compartment may be varied from none to the total number.

ROBERT H. VAN SCHAACK, Jr.